United States Patent [19]

Bailly et al.

[11] Patent Number: 5,087,522
[45] Date of Patent: Feb. 11, 1992

[54] PROCESS FOR THE POLYMERIZATION AND COPOLYMERIZATION OF ALPHA-OLEFINS IN A FLUIDIZED BED

[75] Inventors: Jean C. Bailly; Laszlo Havas, both of Martigues; Stylianos Sandis, Lavera; Alain Blaya; Pierre Crouzet, both of Martigues, all of France

[73] Assignee: BP Chemicals Limited, London, England

[21] Appl. No.: 488,422

[22] Filed: Feb. 27, 1990

Related U.S. Application Data

[60] Continuation of Ser. No. 72,401, Aug. 20, 1987, abandoned, which is a division of Ser. No. 920,930, Oct. 17, 1986, abandoned, which is a continuation of Ser. No. 504,982, Jun. 16, 1983, abandoned.

[30] Foreign Application Priority Data

| Jun. 24, 1982 | [FR] | France | 82 11053 |
| Jun. 24, 1982 | [FR] | France | 82 11055 |
| Jun. 24, 1982 | [FR] | France | 82 11056 |
| Jun. 24, 1982 | [FR] | France | 82 11057 |

[51] Int. Cl.$^5$ ............ C08F 12/34; C08F 4/00; C08F 4/64
[52] U.S. Cl. ............ 428/402; 526/88; 526/901; 526/904; 526/908
[58] Field of Search ............ 428/402; 427/222; 526/88, 126, 901, 904, 908

[56] References Cited

U.S. PATENT DOCUMENTS

| 3,922,322 | 11/1975 | Roger et al. | 526/905 |
| 3,925,338 | 12/1975 | Ort | 526/901 |
| 3,953,414 | 4/1976 | Galli et al. | 526/348 |
| 4,035,560 | 7/1977 | Caumartin et al. | 526/904 |
| 4,056,669 | 11/1977 | Ballard et al. | 526/908 |
| 4,098,979 | 7/1978 | Maemoto et al. | 526/904 |
| 4,111,835 | 9/1978 | Foschini et al. | 526/125 X |
| 4,293,673 | 10/1981 | Hama et al. | 526/125 |
| 4,298,713 | 11/1981 | Mouta et al. | 526/125 |
| 4,302,565 | 11/1981 | Goeke et al. | 526/88 |
| 4,315,874 | 2/1982 | Ikhida et al. | 526/909 |
| 4,370,257 | 1/1983 | Iami et al. | |
| 4,370,456 | 1/1983 | George | 526/901 |
| 4,396,748 | 8/1983 | Shirley | 526/122 |
| 4,421,674 | 12/1983 | Anvernezzi et al. | 526/125 |
| 4,497,904 | 2/1985 | Blaya et al. | 526/225 X |
| 4,517,246 | 5/1985 | Matsuyama | 428/403 |
| 4,521,573 | 6/1985 | Lee et al. | 526/908 |
| 4,774,299 | 9/1988 | Dumain et al. | 526/64 |
| 4,857,611 | 8/1989 | Durand et al. | 526/88 |
| 4,882,400 | 11/1989 | Dumain et al. | 526/88 |
| 4,921,920 | 5/1990 | Collomb-Ceccarini et al. | 526/125 |

FOREIGN PATENT DOCUMENTS

| 0015048 | 9/1980 | European Pat. Off. | |
| 0024933 | 3/1981 | European Pat. Off. | |
| 1434543 | 5/1976 | United Kingdom | |
| 1485520 | 9/1977 | United Kingdom | 526/125 |
| 2006227 | 5/1979 | United Kingdom | |
| 2006232 | 5/1979 | United Kingdom | 526/125 |
| 2033911 | 5/1980 | United Kingdom | 526/125 |
| 1595992 | 8/1981 | United Kingdom | |

OTHER PUBLICATIONS

L. L. Bohm, Ethylene Polymerisation Process with a highly active Ziegler-Natta Catalyst:Polymer 1978, vol. 19, May-Germany.

P. Galli, L. Luciani et G. Cecchin, Advances in the Polymerization of Polyolefins with Coordination Catalyst, Die Angewandte Makromolekulare Chemie 94 (1981) pp. 63-89.

*Primary Examiner*—George F. Lesmes
*Assistant Examiner*—Terrel Morris
*Attorney, Agent, or Firm*—Brooks Haidt Haffner & DeLahunty

[57] ABSTRACT

The present invention relates to a process for polymerizing or copolymerizing alpha-olefins comprising, on the one hand, a prepolymerization stage by contacting one or more alpha-olefins with a Ziegler catalyst system consisting of a solid catalyst containing essentially atoms of halogen, magnesium and transition metal, and a co-catalyst consisting of an organomatellic compound, and, on the other hand, a polymerization or copolymerization stage in a gas phase process by means of a fluidized bed, by contacting one or more alpha-olefins with the prepolymer produced in the first stage, process characterized in that the alpha-olefin prepolymer and polymer or copolymer are in the form of a powder consisting of particules having specific values for the transition metal content and the mean diameter by mass, and characterized in that the particle size distribution of the prepolymer is narrow and easily controlled.

21 Claims, No Drawings

PROCESS FOR THE POLYMERIZATION AND COPOLYMERIZATION OF ALPHA-OLEFINS IN A FLUIDIZED BED

This application is a continuation of application Ser. No. 07/072,401, filed Aug. 20, 1987 which is a divisional of application U.S. Ser. No. 920,930 filed Oct. 17, 1986 which in turn is a continuation of U.S. Ser. No. 504,982 June 16, 1983, all now abandoned.

The present invention relates to a process for polymerising or copolymerising alpha-olefins in the gas phase by means of a fluidised bed.

It is known that catalyst systems for polymerising and copolymerising alpha-olefins, known as Ziegler-Natta catalysts, are obtained by combining on the one hand a catalyst which is a compound of a transition metal belonging to Group IV, V or VI of the Periodic Table of Elements and on the other hand a co-catalyst which is an organo-metallic compound of a metal of Groups I to III of the said Table. The compounds most frequently used are on the one hand halogenated derivatives of titanium and on the other alkylaluminium compounds or alkylaluminium chlorides.

It is known that one can polymerise alpha-olefins in the gas phase, for example in a fluidised-bed reactor in which the solid polymer being formed is maintained in the fluidised state by means of a rising gas stream containing the alpha-olefins to be polymerised. The gas mixture leaving the reactor is generally cooled prior to being recycled to the reactor, with an additional quantity of alpha-olefins added. The polymerisation may be carried out by means of a catalyst system of the Ziegler-Natta type, introduced continuously or semi-continuously into the fluidised-bed reactor. Withdrawal of the polymer produced may also be carried out continuously or semi-continuously.

The two compounds of the catalyst system—the catalyst and the co-catalyst—may be brought into contact with each other either before being introduced into the fluidised-bed reactor or actually inside the reactor. Experience has shown, however, that in this case and whatever the method employed the polymerisation reaction starts up very abruptly as soon as the catalyst or catalytic system is introduced into the fluidised-bed reactor, creating on the one hand localised speeding up of the reaction in the fluidised bed and on the other the bursting of solid particles of catalyst and loss of control of the particle size. These localised bursts of activity in the reaction produce overheating and generally lead to the formation of agglomerates and coagulation of the polymer making up the fluidised bed.

It is also known that one can introduce the catalyst into the fluidised-bed reactor in association with an inorganic granular support. This inorganic granular support generally consists of refractory oxides such as alumina, silica, aluminium silicate or magnesium oxide. The catalyst is usually deposited or impregnated or precipitated on this granular support, which confers specific properties on the said catalyst which are of interest for the technique of fluidised-bed polymerisation, which properties relate in particular to the particle size, resistance to abrasion and activity of the catalyst. Generally speaking it is also known that the dispersion of a catalyst on a granular support of this type is accompanied by an increase in the catalytic activity, especially when the polymerisation reaction commences. The problem associated with this excess activity may be partially solved by dispersing the catalyst over a sufficiently large quantity of support. Unfortunately the polymers or copolymers obtained in this way have comparatively high contents of inorganic residues and this has an adverse effect on their properties.

It is further known that one can use very active catalytic systems comprising catalysts based on magnesium and transition metals, it being possible to obtain these catalysts by reacting organo-magnesium compounds with compounds of transition metals or by pulverising magnesium compounds with compounds of transition metals. In view of their particle size and their very high activity, these catalysts are sometimes introduced into the fluidised bed polymerisation reactor in the form of a prepolymer. In order to avoid overheating, it is desirable to employ relatively high fluidisation speeds, for example, between about 5 and 10 times the minimum fluidisation speed, that is to say, generally between about 40 and 80 cm/sec. Now the prepolymers employed up till now have a mean diameter by mass which is too small and/or a particle size distribution which is too broad to be able to satisfactorily use fluidisation speeds as great as those recommended, if one is to avoid an intensive entrainment of the particles outside the fluidised bed. In fact the use of such prepolymers necessitates the presence of a zone known as a particle release zone, located above the fluidised bed and having a very large volume, together with devices to check and recycle the fine particles entrained outside the fluidised bed, such as cyclones and filters.

In order to avoid this entrainment, it has also been proposed that one should limit the speed of fluidisation to comparatively low figures, for example less than 3 times the minimum speed of fluidisation, that is to say less than about 25 cm/sec. However, in order to eliminate the heat of polymerisation properly, it has been found necessary in the prior art techniques to attach a mechanical agitation system and/or a device for the introduction, recovery and recycling of one or more readily volatile liquids.

It has now been found that it is possible to avoid the above drawbacks and to carry out polymerisation or copolymerisation of alpha-olefins in the gas phase continuously, by means of a fluidised bed, in simplified apparatus making it possible to obtain polymers or copolymers of alpha-olefins having a variety of properties and having very low contents of inorganic residues.

The object of the invention is therefore an improved process for the production of polyolefins which comprises in a first stage the contacting of one more alpha-olefins with a catalytic system of the Ziegler-Natta type comprising on the other hand a solid catalyst occurring in the form of solid particles and containing essentially atoms of halogen, magnesium and transition metals belonging to Groups IV, V and VI of the Periodic Table of Elements and, on the other hand, a co-catalyst consisting of organo-metallic compounds of metals of Groups I to III of the said Table, in order to obtain a prepolymer in the form of solid particles, then in a second stage the contacting of the said prepolymer with one or more alpha-olefins under polymerisation or copolymerisation conditions in the gas phase by means of a fluidised bed, to produce a polymer or copolymer of alpha-olefins directly in the form of a powder, the process being characterised in that:

(a) the prepolymer contains, per gramme, between $2 \times 10^{-3}$ and $10^{-1}$ gramme-milliatom of transition metal and occurs in the form of particles having a mean diameter by mass comprised between 80 and 300 microns and a particle size distribution such that the ratio of the mean diameter by mass Dm to the mean diameter by number Dn is less than or equal to 3;

(b) the alpha-olefin polymer or copolymer contains, per gramme, less than $5 \times 10^{-4}$ gramme-milliatom of transition metal and occurs in the form of a powder consisting of particles having a mean diameter by mass comprised between 300 and 1500, preferably between 400 and 1500 microns.

The catalysts employed according to the invention may be obtained by various processes, especially by those in which a magnesium compound is precipitated at the same time as one or more compounds of transition metals. In particular they may be obtained by reacting an organo-magnesium compound of the reactive Grignard type and a transition metal compound employed in its maximum valency form. Another technique which is equally well known consists in reacting magnesium metal with an alkyl halide and a transition metal compound in its maximum valency state. Precipitation is generally accompanied by the reduction of the transition metal compound to a compound wherein the transition metal is in one of its lower valency states. In view of the particle size properties of these catalysts, it is necessary to proceed to a granulometric separation operation such as screening of the catalyst and/or the prepolymer itself in order to get the desired particle size distribution, it being known that the particle size distribution of the prepolymer is similar to that of the catalyst from which it originates.

One may also use a catalyst consisting of a transition metal compound deposited on a magnesium compound support such as magnesium chloride, magnesium hydroxychloride, magnesium alcoholates or magnesium acetate. In particular one can use a support of the kind obtained by pulverising anhydrous magnesium chloride or by the precipitation reaction of an organo-magnesium compound and a halogenated compound. In this case, too, a granulometric selection operation, for example screening of the support, the catalyst and/or the prepolymer usually has to be performed.

According to one preferred mode of embodiment of the invention it is possible to avoid the above-mentioned granulometric selection operation by using, as catalyst support, particles of magnesium chloride obtained by reacting an organo-magnesium compound and a chlorinated organic compound, complying with the following conditions:

the organo-magnesium compound is either a magnesium dialkyl of the formula $R_1MgR_2$, or an organo-magnesium derivative of the formula $R_1MgR_2 \cdot xAl(R_3)_3$, in which formulae $R_1$, $R_2$ and $R_3$ are identical or different alkyl radicals having 2 to 12 carbon atoms and x is comprised between 0.001 and 10, and preferably between 0.01 and 2.

the chlorinated organic compound is an alkyl chloride of the formula $R_4Cl$, in which $R_4$ is a secondary or preferably a tertiary alkyl radical having 3 to 12 carbon atoms.

the reaction is carried out in the presence of an electron donor compound which is an organic compound comprising at least one atom of oxygen, sulphur, nitrogen and/or phosphorus. It may be chosen from among a wide variety of products such as amines, amides, phosphines, sulphoxides, sulphones or ethers. Amongst electron donor compounds one may select in particular an aliphatic ether oxide of the formula $R_5OR_6$, in which $R_5$ and $R_6$ are identical or different alkyl radicals having 1 to 12 carbon atoms. Moreover, the various reactants involved in the preparation of such a support may be employed under the following conditions:

the molar ratio of $R_4Cl:R_1MgR_2$ is comprised between 1.5 and 2.5 and preferably comprised between 1.85 and 2.2; the molar ratio of $R_4Cl:R_1MgR_2 \cdot xAl(R_3)_3$ is comprised between $1.5(1+3/2x)$ and $2.5(1+3/2x)$ and preferably between $1.85(1+3/2x)$ and $2.2(1+3/2x)$;

the molar ratio between the electron donor compound and the organo-magnesium compound ($R_1MgR_2$ or $R_1MgR_2 \cdot xAl(R_3)_3$ is comprised between 0.01 and 2 and preferably comprised between 0.01 and 1;

the reaction between the organo-magnesium compound and the chlorinated organic compound takes place with agitation in a liquid hydrocarbon at a temperature comprised between 5 and 80° C.

When one operates in accordance with these conditions it is possible to obtain a magnesium chloride support having a mean diameter by mass comprised in particular between 10 and 100 microns and a particle size distribution such that Dm:Dn is less than or equal to 3. The catalysts and then the prepolymers prepared from these supports have a similar particle size distribution, so that no granulometric selection operation such as screening is necessary.

The transition metal compounds may be deposited on the support according to methods which are well-known in themselves.

However, in order to obtain a catalyst with a better activity, especially for the polymerisation of ethylene or the copolymerisation of ethylene and higher alpha-olefins, and to obtain a prepolymer complying with the characteristics described according to the invention, it is advantageous to deposit on the support by precipitation a transition metal compound such as a titanium compound whose valency is less than 4. This precipitation may be carried out according to known processes but is advantageously performed according to the following process:

the reaction of reducing a titanium compound of maximum valency, of the formula $Ti(OR_7)_{4-n}X_n$, in which is an alkyl group containing 2 to 6 carbon atoms, X is a chlorine or bromine atom and n is an integer or fraction from 1 to 4 inclusive, is carried out by means of a reducing agent chosen from among the organo-magnesium compounds having the formula $R_8MgR_9$, in which $R_8$ and $R_9$ are identical or different alkyl groups containing from 2 to 12 carbon atoms, organo-zinc compounds of the formula $Zn(R_{10})_{2-y}X_y$, in which $R_{10}$ is an alkyl radical with 2 to 12 carbons, X is chlorine or bromine and y is 0 or 1 or a fraction less than 1, and organo-aluminium compounds of the formula $Al(R_{11})_{3-x}X_2$, in which $R_{11}$ is an alkyl group having 2 to 12 carbon atoms, X is chlorine or bromine and x is 0 or an integer or fraction not greater than 2;

the said reduction reaction is performed in the presence or absence of an electron donor compound chosen from among organic compounds comprising at least one atom of oxygen, sulphur, nitrogen and/or phosphorus, such as amines, amides, phosphines, sulphoxides, sulphones or ethers; more particularly from among the ethers preference may be given to aliphatic ether oxides of the formula $R_{12}OR_{13}$, in which $R_{12}$ and $R_{13}$ are identical or different alkyl groups with 1 to 12 carbon atoms;

the relative quantities of the various compounds (support, titanium compound, organo-magnesium, organo-zinc or organo-aluminium compounds, electron donor) by molar ratio are such that:

support:titanium compound is comprised between 1 and 50 and preferably comprised between 2.5 and 10;

organo-magnesium or organo-zinc or organo-aluminium compound:titanium compound is less than 3 and preferably comprised between 0.5 and 1.5;

electron donor compound:titanium compound is comprised between 0 and 5 and preferably comprised between 0.1 and 1.5.

The precipitation is performed at a temperature comprised between $-30°$ C. and $100°$ C., with agitation, in a liquid hydrocarbon medium.

The way the reactants are used can vary. For example the reducing agent (organo-magnesium, organo-zinc or organo-aluminium compound) may be introduced gradually into the liquid hydrocarbon medium containing the support and the titanium compound. It is also possible to introduce both gradually and simultaneously the reducing agent and the titanium compound into the liquid hydrocarbon medium containing the support. However, it has been found that the best results are obtained when the support is impregnated by means of the reducing agent in a first stage, the reaction of the support thus impregnated with the tetravalent titanium compound being carried out in a second stage, possibly in the presence of an electron donor compound such as an aliphatic ether oxide.

In other cases, for example in the case of the polymerisation of propylene or copolymerisation of propylene with ethylene or other alpha-olefins, catalysts are sought which not only have a satisfactory activity but also a very high degree of stereo-specificity, so as to obtain mainly isotactic polymers. Particularly good results are then obtained by impregnating the magnesium chloride support with titanium tetrachloride, this impregnation preferably being performed in the presence of an electron donor compound. The preparation of these catalysts from supports is advantageously carried out in two stages, namely:

(a) a treatment of the support by means of an electron donor compound of the aromatic acid ester or aromatic ether type, (b) an impregnation of the support thus treated by means of titanium tetrachloride.

In the first stage the quantity of electron donor to be used is comprised between 0.06 and 0.2 mole of electron donor per mole of magnesium compound of the support, and the temperature to be used is comprised between about $20°$ and $50°$ C.

In the second stage the support is impregnated with pure titanium tetrachloride or using titanium tetrachloride in a hydrocarbon medium; the quantities of titanium tetrachloride must be sufficient to fix on the support from 0.5 to 3 atoms of titanium per 100 atoms of magnesium present in the support, the impregnation temperature being comprised between about $80°$ and $100°$ C.

The catalysts obtained according to these various processes advantageously occur in the form of a powder consisting of particles with a particle size similar to that of the support employed, and in particular a particle size more or less identical to it.

According to the invention the prepolymer is obtained by contacting one or more alpha-olefins with the catalyst and the co-catalyst consisting of organo-metallic compounds of a metal of Groups I to III of the Periodic Table of Elements, such as organo-aluminium compounds. The prepolymer contains, per gramme, between $2 \times 10^{-3}$ and $10^{-1}$ gramme-milliatom of transition metal and preferably between $4 \times 10^{-3}$ and $3 \times 10^{-2}$ gramme-milliatom of transition metal.

The prepolymer must also occur in the form of a powder consisting of particles with a mean diameter by mass, Dm, comprised between 80 and 300 microns for example between 100 and 300 microns, and preferably comprised between 100 and 240 microns.

According to the invention the prepolymer must also occur in the form of a powder consisting of particles having a particle size distribution such that the ratio Dm:Dn of the mean diameter by mass Dm to the mean diameter by number Dn is less than or equal to 3 and preferably comprised between 1.1 and 2.5. Depending on the polymerisation or copolymerisation conditions in the gas phase using a fluidised bed, it may be preferable to use a prepolymer powder having a very narrow particle size distribution, such that the ratio Dm:Dn is comprised between 1.1 and 1.5, or else a prepolymer powder having a less narrow particle size distribution such that the ratio Dm:Dn is comprised between 1.5 and 2.5. In one embodiment of the present invention it is preferred to use prepolymer having a particle size distribution such that the ratio Dm/Dn is less than or equal to 1.3. Preferably the prepolymer powder contains practically no particles with a diameter greater than $2 \times Dm$ and less than $0.2 \times Dm$. The particle size distribution of the prepolymer powder may also be such that more than 90% by weight of the particles of one and the same batch are comprised in the bracket $Dm \pm 10\%$.

The prepolymers described according to the invention have the advantage of not containing mineral compounds based on refractory oxides, such as alumina silica, aluminium silicate or magnesia oxide.

The prepolymers are obtained when one or more alpha-olefins are brought into contact with the catalyst and co-catalyst. This operation known as prepolymerisation may be carried either in suspension in a liquid medium, such as aliphatic hydrocarbons, or liquid alpha-olefins, or in the gas phase.

As co-catalyst organo-aluminium compounds may be used, such as those of the formula $Al(R_{14})_3$, in which $R_{14}$ is an alkyl radical having 2 to 12 carbon atoms. Preferably organo-aluminium compounds are employed which are not readily volatile, such as for example tri-n-octylaluminium.

In the particular case of production of polypropylene or propylene copolymer, the co-catalyst employed is preferably an organo-aluminium compound complexed by an electron donor compound of the aromatics acid ester type. The molar ratio between the electron donor compound and the organo-aluminium compound is comprised between 0.1 and 0.5 and preferably equal to about 0.3. An inadequate quantity of electron donor compound decreases the stereospecificity of the catalyst system and too great a quantity, on the other hand, diminishes the activity of the catalyst system.

In this prepolymerisation operation the relative molar quantities of organo-aluminium compound in relation to the transition metal compound employed may vary within very wide fields; for example the atomic ratio Al:transition metal may vary between 0.5 and 200.

Prepolymerisation can be carried out to advantage in two stages.

The first stage of prepolymerisation, or catalyst coating stage, is preferably carried out under conditions such that the reaction speeds are relatively slow. The part played by this stage, whilst scrupulously preserving the shape of the catalyst particles, but on a larger scale, is to produce a catalyst known as a coated catalyst, having better properties for the subsequent stages of fluidised-bed polymerisation, these properties being in particular an adequate mechanical strength, a suitable resistance to abrasion, an apparent density compatible with the fluidisation conditions and a controlled activity.

The coating stage, if any, is perforce effected by the polymerisation or copolymerisation of alpha-olefins in suspension in a liquid medium. This stage, generally speaking, may continue until the coated catalyst obtained contains from 0.1 to 10 g of polymer or copolymer per gramme-milliatom of transition metal.

The second stage of prepolymerisation may take place either in suspension in a liquid medium or in the gas phase; generally this stage may be continued, whilst preserving a suitable activity in the catalyst, until the prepolymer contains, per gramme, between $2 \times 10^{-3}$ and $10^{-1}$ preferably between $4 \times 10^{-3}$ and $3 \times 10^{-2}$ gramme-milliatom of transition metal.

Various means in themselves known may be employed in order to obtain prepolymer powders having, in particular, a particle size distribution as defined according to the invention. Among other things one may use processes involving selecting the desired particle size, such as screening, or granulometric fractionation by means of a gas stream or by means of a stream of liquid. These particle size selection operations may be performed either on the prepolymer or on the catalyst, or where appropriate on the support from which it originated. They are preferably carried out under conditions such that the catalyst systems present in these prepolymer powders do not lose their activity during these operations. In particular, the gases or liquids involved must be completely inert in respect of these catalyst systems.

However, it is preferable for the sake of greater simplicity and better process efficacity as a whole, to employ for the prepolymerisation of the catalysts solids having a particle size distribution such that they directly produce the desired prepolymer powder. It is in fact important during the prepolymerisation operations to control the process so that the prepolymer particles develop in a regular way to the extent that they have similar shapes to the original catalyst particles, but on a larger scale. The result is that the prepolymer obtained has a suitable particle size distribution similar to that of the catalyst from which it originated, and that it is therefore directly ready for use.

The prepolymer as described according to the invention is then brought into contact with one or more alpha-olefins in the polymerisation or copolymerisation stage in the gas phase, by means of a fluidised bed. This operation is advantageously performed continuously by techniques in themselves known, according to which the gaseous mixture containing the alpha-olefins to be polymerised circulates with a gas stream rising through a fluidised bed consisting of particles of polymer or copolymer being formed. The alpha-olefins to be polymerised are introduced into the fluidised-bed reactor at a temperature such that the reaction medium is at a temperature of at least 60° C. and advantageously at least 80° C.

The speed of fluidisation in the fluidised bed reactor is preferably high enough to ensure homogenisation of the fluidised bed and to be able to eliminate effectively the heat given off by the polymerisation without having recourse to any other homogenisation method, particularly mechanical. The speed of fluidisation is preferably equal to 5 to 10 times the minimum speed of fluidisation, that is to say generally comprised between about 40 and 80 cm/sec. In traversing the fluidised bed, only a part of the alpha-olefins polymerises in contact with the particles of polymer or copolymer in process of growth. The fraction of the alpha-olefins which has not polymerised leaves the fluidised bed and passes through a cooling system intended to eliminate the heat produced during the reaction, prior to being recycled into the fluidised bed reactor by means of a compressor.

The mean pressure in the reactor may be close to atmospheric pressure, but is preferably higher in order to increase the speed of polymerisation. For example it may attain 3 MPa.

According to the invention the polymerisation or copolymerisation is advantageously stopped when the polymer or copolymer contains, per gramme, less than $5 \times 10^{-4}$ and preferably less than $2 \times 10^{-4}$ gramme-milliatom of transition metal.

The polymer or copolymer thus obtained occurs in the form of a powder consisting of particles having a mean diameter by mass Dm comprised between 300 and 1500 microns and preferably comprised between 600 and 1200 microns and having a particle size distribution such that the ratio Dm:Dn is less than or equal to 3.5 and preferably is comprised between 1.2 and 3. The width of particle size distribution of the powder making up the fluidised bed depends not only on that of the prepolymer employed but also on the mean residence time of the polymer or copolymer in the fluidised-bed reactor, and also on the speed at which the catalyst system loses its activity during the polymerisation or copolymerisation reaction. In particular it is advantageous in such a process to use a catalyst system which loses its activity comparatively rapidly during the reaction in order amongst other things, to obtain a powder with the narrowest possible particle size.

With a view to obtaining control of the molecular weight of the polymers or copolymers it is possible during the preparation of the prepolymer and in the fluidised-bed polymerisation or copolymerisation stage to mixe the alpha-olefins to be polymerised or copolymerised with a chain-transfer agent such as hydrogen, in a molar ratio of hydrogen:alpha-olefins comprised for example between 10 and 80%.

In some cases, particularly when the quantity of prepolymer used in the polymerisation is small, it may be convenient to mix a prepolymer with polymer or copolymer which has already been formed, coming from a previous operation, in order to be able to commence polymerisation in the fluidised bed with a quantity of solid material corresponding to an adequate height of the fluidised bed.

According to the process of the invention it is possible to produce under satisfactory industrial conditions which are very simplified, a large number of polymers and copolymers of alpha-olefins of a very reproducible quality, and in particular:

high-density polyethylenes (density greater than 0.940), among which one may identify homopolymers of ethylene and copolymers of ethylene and alpha-olefins having from 3 to 8 carbon atoms;

linear low-density polyethylenes (density less than 0.940), consisting of copolymers of ethylene and one or more alpha-olefins having 3 to 8 carbon atoms, the molar content of units derived from ethylene being equal to or greater than 90%;

elastomeric terpolymers of ethylene, propylene and dienes;

elastomeric copolymers of ethylene and propylene, having a content by weight of units derived from ethylene comprised between about 30 and 70%;

isotactic polypropylenes and copolymers of propylene and ethylene or other alpha-olefins, having a content by weight of units derived from propylene equal to or greater than 90%;

copolymers of propylene and butene-1 having a content by weight of units derived from butene-1 comprised between 10 and 40%.

Generally, ethylene homopolymers and ethylene/alpha-olefin copolymers having a major proportion of ethylene units prepared by the process of the present invention are powders containing less than 350 ppm, preferably less than 150 ppm of inorganic residues which are free from refractory oxide support materials. The polyolefin powders have a high bulk density which can be, for example, at least 0.40 grammes per cubic cm and is frequently at least 0.45 grammes per cubic centimeter.

Method of Determining the Mean Diameters by Mass (Dm) and by Number (Dn) of the Particles (Support, Catalyst, Prepolymer or Polymer)

According to the invention the mean diameters by mass (Dm) and by number (Dn) of the particles of support, catalyst, prepolymer or polymer are measured on the basis of microscope examinations, by means of the OPTOMAX image analyser (Micro-Measurements Ltd, Great Britain). The measuring principle consists in obtaining, from the experimental study by optical microscope, of a population of particles, a table of frequencies giving the number (ni) of particles belonging to each class (i) of diameter, each class (i) being characterised by an intermediate diameter (di) comprised between the limits of the said class.

According to the approved French Standard NF X 11-630 of June 1981, Dm and Dn are provided by the following formulae:

$$\text{mean diameter by mass: } Dm = \frac{\Sigma ni \, (di)^3 di}{\Sigma ni \, (di)^3}$$

$$\text{mean diameter by number: } Dn = \frac{\Sigma nidi}{\Sigma ni}$$

The ratio Dm:Dn characterises the particle size distribution; it is sometimes referred to as the "width of particle size distribution."

Measurement by the OPTOMAX image analyser is carried out by means of an inverted microscope which makes it possible to examine suspensions of particles of support, catalyst, prepolymer or polymer at an enlargement comprised between 16 and 200x. A television camera picks up the images given by the inverted microscope and transmits them to a computer which analyses the images received line by line and dot by dot on each line in order to determine the dimensions of diameters of the particles and then to classify them.

The following non-restrictive examples illustrate the invention.

EXAMPLE 1

Preparation of the Support

Into a 5-liter stainless steel reactor equipped with an agitation system turning at 750 revolutions per minute and containing 800 ml of n-hexane, there is introduced, at ambient temperature (20° C.) and under a blanket of nitrogen, 1725 ml of a solution of butyloctylmagnesium in n-hexane containing 1500 gramme milliatoms of magnesium, and 153 ml (750 millimoles) of di-isoamyl ether. The reactor is then heated to 50° C. and over 3 hours 322 ml of t-butyl chloride (or 2925 milliatoms) is progressively added.

At the end of this addition, the suspension is maintained at 50° C. for 3 hours and the precipitate obtained is washed with n-hexane.

The solid product (A) obtained has the following composition per gramme atom of magnesium: 1.97 gramme atoms of chlorine, 0.03 gramme equivalents of Mg-C bonds and 0.02 mole of di-isoamyl ether.

On microscopic examination, the solid product (A) was seen to be in the form of a powder consisting of spheroidal particles (the mean ratio between the large and small axes, D/d, of the particles is equal to 1.2), having a narrow particle size distribution, defined by the ratio Dm/Dn=1.1 with Dm=52 microns; it is found furthermore that more than 90% by weight of the particles have a mean diameter comprised between 47 and 57 microns; the density of the product is equal to 1.9 and its specific surface area to 38 $m^2/g$ (BET); the surface of the particles is perfectly smooth.

EXAMPLE 2

As catalyst support there was used the product (A) prepared as in Example 1 above.

Production of the Catalyst

To 3000 ml of suspension in n-hexane of product (A), containing 1450 milliatoms of $MgCl_2$, there is added with agitation 82 ml of di-isoamyl ether and 400 ml of a 1.2 molar solution of diethylaluminium chloride in n-hexane (or 480 milliatoms). The reactor is brought to 50° C., and there is introduced progressively over 2 hours, 650 ml of a 0.6 molar solution of di-n-propoxytitanium dichloride in n-hexane (or 390 millimoles). At the end of this addition the temperature is brought to 80° C. and the mixture is maintained at this temperature for 2 hours. The catalyst obtained is then washed five times with n-hexane to give the catalyst solid ready for use (B). Analysis of the catalyst (B) shows that it contains per gramme atom of total titanium: 0.94 gramme atom of trivalent titanium; 0.06 gramme atom of tetravalent titanium; 3.85 gramme atoms of magnesium; 9.97 gramme atoms of chlorine; 0.20 gramme atom of aluminium; and 0.11 mole of di-isoamyl ether. The catalyst thus defined is a brown powder consisting of grains of spheroidal shape, having a narrow particle size distribution such that more than 90% of the particles have a mean diameter comprised between 50 and 60 microns, with Dm=55 microns; it is found, furthermore, that the ratio Dm/Dn of the catalyst particles is equal to 1.2; the surface of the particles is perfectly smooth.

Prepolymerisation (First Stage)

Into a 5-liter stainless steel reactor equipped with an agitation system turning at 750 revolutions per minute and containing 2 liters of n-hexane heated to 50° C., there is introduced under a blanket of nitrogen 100 millimoles of tri-n-octylaluminium (TnOA) and a suspension of catalyst (B) in hexane containing 500 gramme-milliatoms of titanium [or 295 g of (B)]. The reactor is heated to 60° C. and ethylene is introduced at a constant rate equal to 167 g per hour, over 3 hours. At the end of the reaction the whole is decanted into a rotary evaporator under vacuum; in this way 820 g of dry powder (C) of a light brown coloured prepolymer are obtained, consisting of particles with a mean diameter by mass equal to 66 microns and a narrow particle size distribution, such that the ratio Dm/Dn is equal to 1.2. The powder (C) is preserved under nitrogen.

Prepolymerisation (Second Stage)

Into a fluidised bed reactor with a diameter of 15 cm operating with a gas speed of 10 cm/sec such that the partial pressures of the components are 0.8 MPa nitrogen, 0.1 MPa of hydrogen and 0.1 MPa of ethylene, every 6 minutes there is introduced 11 g of the powder (C) and continuously 25 g per hour of pure TnOA, into the bottom half of the bed maintained at 70° C. During intermittent withdrawals there are collected 4 kg per hour of a slightly beige-tinted powder which shows, for a residence time of half an hour in the reactor, a titanium content of 800 ppm of titanium (or $1.67 \times 10^{-2}$ gramme-milliatoms of titanium per gramme of prepolymer), a mean diameter by mass of 260 microns, a particle size distribution such that the ratio Dm/Dn is equal to 1.3 and a bulk density of 0.41 g/cm$^3$; the pre-polymer (D) thus obtained is also preserved under nitrogen.

Polymerisation of Ethylene

Into a fluidised bed reactor with a diameter of 46 cm operating with a rising gas propelled at a speed of 45 cm/sec and under partial pressures of 1.2 MPa of hydrogen and 0.8 MPa of ethylene, there is introduced in a sequential manner 0.5 kg per hour of prepolymer (D) into the bed maintained at 85° C. During the intermittent withdrawals there are collected 25 kg per hour of a white powder which, for a residence time of 6 hours in the reactor, shows a content of 16 ppm of titanium (or $3.3 \times 10^{-4}$ gramme-milliatoms of titanium per gramme of polymer), a mean diameter by mass of 940 microns, a narrow particle size distribution such that the ratio Dm/Dn is equal to 1.5 and a bulk density of 0.47 g/cm$^3$; moreover the melt index under 2.16 kg at 190° C. is 6 g/10 minutes and the molecular weight distribution, Mw/Mn, measured by GPC, is equal to 4.0.

The produced polymers contained about 218 ppm of inorganic residue.

EXAMPLE 3

There is used as support (A) a powder based on magnesium chloride, consisting of spherical particles having a narrow particle size distribution, such that more than 90% by weight of the particles have a mean diameter comprised between 29 and 35 microns, with Dm=32 microns; moreover, it is ascertained that the ratio Dm/Dn is equal to 1.1; this powder shows a density equal to 1.85 and a specific surface area equal to 41 m$^2$/g (BET).

Preparation of the Catalyst

This is identical to that of Example 2. Analysis of the catalyst (B) obtained gives per gramme-atom of total titanium: 0.96 gramme-atom of trivalent titanium; 0.04 gramme-atom of tetravalent titanium; 3.60 gramme-atom of magnesium; 9.40 gramme-atoms of chlorine; 0.13 gramme-atom of aluminium and 0.07 mole of di-isoamyl ether. The catalyst (B) is a brown-coloured powder composed of spherical particles, having a narrow particle size distribution such that more than 90% by weight of the particles have a mean diameter comprised between 30 and 36 microns with Dm=33 microns; it is ascertained furthermore that the ratio Dm/Dn is equal to 1.2; the surface of the catalyst particles is slightly dented, of the "raspberry" type.

Prepolymerisation (First Stage)

This is identical to that of Example 2. 807 g of a dry powder (C) of a prepolymer, having a mean diameter by mass equal to 40 microns and a narrow particle size distribution, such that the ratio Dm/Dn is equal to 1.2, are obtained.

Pre-co-polymerisation (Second Stage)

Into a fluidised bed reactor with a diameter of 15 cm operating with a rising gas propelled at a speed of 10 cm/sec and under partial pressures of 1 MPa of nitrogen, 0.04 MPa of hydrogen, 0.05 MPa of butene-1 and 0.13 MPa of ethylene, there are introduced every 6 minutes 6.5 g of the powder (C) and continuously 26.4 g per hour of TnOA into the bed maintained at 70° C. There was withdrawn 4 kg per hour of powder (D) of a pre-copolymer of ethylene which contained, per gramme, $10^{-2}$ gramme-milliatom of titanium, for a residence time of half an hour in the reactor. This powder had a mean diameter by mass of 190 microns, a particle size distribution such that the ratio Dm/Dn is equal to 1.3 and a bulk density of 0.36 g/cm$^3$.

Copolymerisation of Ethylene and Butene-1

Into a fluidised bed reactor with a diameter of 46 cm operating with a rising gas propelled at a speed of 45 cm/sec and under partial pressures of 0.7 MPa of nitrogen, 0.2 MPa of hydrogen, 0.26 MPa of butene-1 and 0.84 MPa of ethylene, there are introduced 0.44 kg/hr of the pre-copolymer (D) into the bed maintained at 80° C. On withdrawal there are collected 21 kg per hour of a powder of copolymer of ethylene which contains, per gramme of copolymer, $2.1 \times 10^{-4}$ gramme-milliatoms of titanium, for a residence time of 6 hours in the reactor. This copolymer powder has a mean diameter by mass of 720 microns and a particle size distribution such that the ratio Dm/Dn of the particles is equal to 1.6; moreover, melt index under 2.16 kg at 190° C. is equal to 1 g/10 mins; its density at 20° C. is equal to 0.917 and its bending strength is 21 MPa; the bulk density is equal to 0.40 g/cm$^3$. The produced copolymer contained 136 ppm of inorganic residue.

EXAMPLE 4

There is used as support (A) a powder based on magnesium chloride, consisting of spherical particles having a particle size distribution such that the ratio Dm/Dn is equal to 2.3 with Dm=23 microns; this powder has a density equal to 2.1.

Preparation of the Catalyst

This is identical to that of Example 2. Analysis of the product (B) obtained gives per gramme-atom of total titanium: 0.94 gramme-atom of trivalent titanium; 0.06 gramme-atom of tetravalent titanium, 3.80 gramme-atoms of magnesium, 9.84 gramme atoms of chlorine, 0.16 gramme-atom of aluminium and 0.08 mole of di-isoamyl ether. The catalyst (B) is a brown powder composed of spheroidal particles, having a particle size distribution such that the ratio Dm/Dn is equal to 2.4, with Dm=23 microns.

Prepolymerisation (First Stage)

This is identical to that of Example 2. There are obtained 817 g of dry powder (C) of a prepolymer having a mean diameter by mass equal to 28 microns and a particle size distribution such that the ratio Dm/Dn is equal to 2.4.

Prepolymerisation (Second Stage)

Into a fluidised bed reactor with a diameter of 15 cm operating with a rising gas propelled at a speed of 10 cm/sec., and under partial pressures of 1.8 MPa of nitrogen, 0.1 MPa of hydrogen and 0.1 MPa of ethylene, there are introduced every 5 minutes 2.2 g of powder (C) and continuously 28 g per hour of TnOA into the bottom half of the bed maintained at 70° C. The powder (D) of prepolymer recovered on withdrawal at the rate of 4 kg/h contains, per gramme, $4 \times 10^{-3}$ gramme-milliatoms of titanium, for a residence time of half an hour in the reactor. This powder has a mean diameter by mass of 175 microns, a particle size distribution such that the ratio Dm/Dn is equal to 2.5, and a bulk density of 0.42 g/cm$^3$.

Polymerisation of Ethylene

This is identical to that of Example 2. There are obtained in this way a polyethylene containing, per gramme, $8 \times 10^{-5}$ gramme-milliatoms of titanium; the polyethylene powder has a mean diameter by mass of 640 microns, a particle size distribution such that the ratio Dm/Dn of the particles is equal to 2.8 and a bulk density of 0.51 g/cm$^3$; moreover the melt index under 2.16 kg at 190° C. is 8 g/10 minutes. The produced polyethylene contained about 54 ppm of inorganic residue.

EXAMPLE 5

There is used as support (A) a powder based on magnesium chloride, consisting of spheroidal particles having a particle size distribution such that the ratio Dm/Dn is equal to 1.3, with Dm=23 microns.

Preparation of the Catalyst

Into 3000 ml of suspension in n-hexane of product (A) containing 1450 millimoles of MgCl$_2$, there is added under agitation 82 ml of di-isoamyl ether and 330 ml of a 1.2 molar solution of diethyl aluminium chloride in n-hexane (or 396 millimoles). The reactor is brought to 50° C. and there is introduced progressively over 2 hours 650 ml of a 0.6 molar solution of di-n-propoxytitanium dichloride in n-hexane (or 390 millimoles). At the end of this addition, the temperature is brought to 80° C. and maintained there for 2 hours. The catalyst obtained is then washed five times with n-hexane to give the catalytic solid ready for use (B). Analysis of the catalyst (B) obtained shows that it contains per gramme-atom of total titanium: 0.94 gramme-atom of trivalent titanium, 0.06 gramme-atom of tetravalent titanium, 3.80 gramme-atoms of magnesium, 9.90 gramme-atoms of chlorine, 0.20 gramme-atom of aluminium and 0.10 mole of di-isoamyl ether. The catalyst thus defined is a brown-coloured powder composed of particles of spheroidal shape, having a particle size distribution such that the ratio Dm/Dn is equal to 1.3, with Dm=23 microns; the surface of the particles is smooth.

Prepolymerisation (First Stage)

Into a 5-liter stainless steel reactor, fitted with an agitation system turning at 750 revolutions per minute and containing 2 liters of n-hexane heated to 50° C., there are introduced under a blanket of nitrogen 80 millimoles of tri-n-octyl aluminium (TnOA) and a suspension of catalyst (B) in hexane containing 80 gramme-atoms of titanium [or 46 g of (B)]. The reactor is heated to 60° C. and ethylene is introduced at a constant rate equal to 167 g/hour for a period of 3 hours. At the end of the reaction the whole is decanted into a rotary evaporator under vacuum, in this way are obtained 570 g of dry powder (C) of a light brown-coloured prepolymer, composed of particles of a mean diameter by mass equal to 50 microns and an particle size distribution such that the ratio Dm/Dn is equal to 1.4. The powder (C) is preserved under nitrogen.

Prepolymerisation (Second Stage)

Into a fluidised bed reactor with a diameter of 15 cm operating with a gas speed of 10 cm/sec, under partial pressures of 0.8 MPa of nitrogen, 0.1 MPa of hydrogen and 0.1 MPa of ethylene, there are introduced every six minutes 12 g of the powder (C) into the bottom half of the bed maintained at 70° C. In a series of withdrawals, there are collected 40 kg/hour of a slightly beige-tinted powder (D) which contains, per gramme, $4 \times 10^{-3}$ gramme-milliatoms of titanium, for a residence time of 2 hours in the reactor. This powder has a particle size distribution such that the ratio Dm/Dn of the particles is equal to 1.6, with Dm=172 microns, and a bulk density of 0.41 g/cm$^3$; the prepolymer (D) thus obtained is also preserved under nitrogen.

Polymerisation of Ethylene

Into a fluidised bed reactor with a diameter of 46 cm operating with a rising gas propelled at a speed of 45 cm/sec and under partial pressures of 1.2 MPa of hydrogen and 0.8 MPa of ethylene, there are introduced in a sequential manner 0.5 kg/hour of prepolymer (D) and continuously 29.8 g/hour of TnOA into the bottom half of the bed maintained at 85° C. On sequential withdrawal, there are recovered 25 kg/hour of white powder which contains, per gramme, $8 \times 10^{-5}$ gramme-milliatoms of titanium, for a residence time of 5 hours in the reactor. This powder has a particle size distribution such that the ratio Dm/Dn of the particles is equal to 1.8, with Dm=650 microns, and a bulk density of 0.52 g/cm$^3$; moreover, the melt index under 2.16 kg at 190° C. is 6 g/10 minutes and the molecular weight distribution, Mw/Mn, measured by GPC, is equal to 4.

The produced polymer contained about 54 ppm of inorganic residue.

EXAMPLE 6

The support (A) is used prepared as in Example 5.

Preparation of Catalyst

Into 3000 ml of suspension of support (A) containing 1450 millimoles of MgCl$_2$, there are added under agitation 8.2 ml of di-isoamyl ether and 270 ml of a 1.2 molar solution in n-hexane of diethylaluminium chloride. The reaction medium is heated to 30° C. and over 2 hours 650 ml of a 0.6 molar solution of titanium tetrachloride are added progressively. At the end of this addition, the medium is heated to 80° C. and maintained under agitation at this temperature for 2 hours. The catalyst obtained is then washed five times with n-hexane to produce the catalyst solid (B) ready for use.

Analysis of the catalyst (B) shows that it contains per gramme-atom of total titanium: 0.97 gramme-atom of trivalent titanium, 0.03 gramme-atom of tetravalent titanium, 3.7 gramme-atoms of magnesium, 11.2 gramme atoms of chlorine, 0.33 gramme-atom of aluminium, and 0.01 mole of di-isoamyl ether.

The catalyst thus defined is a brown-coloured powder composed of spheroidal particles, having a particle size distribution such that the ratio Dm/Dn is equal to 1.4, with Dm=23 microns.

Prepolymerisation in Suspension

Into a 5-liter stainless steel reactor there are introduced 3000 ml of n-hexane which is heated to 70° C. with agitation (750 revolutions per minute), 19 ml of a 1.14 molar solution in n-hexane of tri-n-octylaluminium, 16.7 ml of a suspension of the catalyst (B) containing 0.13 gramme-atom of titanium per liter and a volume of 1500 ml of hydrogen, measured under normal conditions. Ethylene is then introduced at a throughput of 180 g/hr for 3 hours, together with 1500 ml of hydrogen, measured under normal conditions, after 1½ hours of reaction. The prepolymer obtained is dried at 70° C. under nitrogen, the quantity collected being 530 g. The prepolymer powder contains, per gramme, $4.1 \times 10^{-3}$ gramme-milliatoms of titanium. It has a particle size distribution such that the ratio Dm/Dn of the particles is equal to 1.8, with Dm=180 microns. The bulk density is equal to 0.36 g/cm$^3$.

Polymerisation of Ethylene

This is identical to that of Example 4 except that the prepolymer prepared in Example 6 is used, and that the pressures for hydrogen and ethylene are 0.6 and 1.4 MPa respectively. The prepolymer is introduced into the fluidised bed at a throughput of 0.470 kg/hr and the production is 30 kg/hr of polyethylene. The polymer obtained has a mean diameter by mass of 700 microns, a bulk density of 0.44 g/cm$^3$, a melt index under 5 kg at 190° C. of 1 g/10 mins and a molecular weight distribution, Mw/Mn, equal to 10. The polymer contains, per gramme, $6 \times 10^{-5}$ gramme-milliatoms of titanium.

The polymer was found to contain about 40 ppm of inorganic residue.

EXAMPLE 7

Preparation of the Support

Into a glass reactor, having a capacity of 1 liter, fitted with an agitation system turning at 500 revolutions per minute, there is introduced at ambient temperature and under nitrogen 550 ml of a solution in n-hexane of dibutyl magnesium containing 500 gramme-milliatoms of magnesium and 51 ml of di-isoamyl ether (250 millimoles).

The reactor is then heated to 50° C. and there is introduced, drop by drop over 2 hours, 115 ml of tertiary butyl chloride (1050 millimoles). At the end of this addition, the suspension is maintained at 50° C. for 2 hours and the precipitate obtained is washed at the same temperature with n-hexane.

The support thus formed contains per gramme-atom of magnesium: 2.0 gramme-atoms of chlorine and 0.011 mole of di-isoamyl ether.

Under microscopic examination, the support is seen to be in the form of spheroidal particles (the ratio D/d between the large and small axes of the particles is on average equal to 1.2) having a particle size distribution such that Dm/Dn equals 1.2 with Dm=60 microns; it is found that more than 90% by weight of the particles have a mean diameter comprised between 54 and 66 microns; these particles have a smooth surface, a specific surface area equal to 42 m$^2$/g (BET) and a density equal to 1.3.

Preparation of the Catalyst

Into a glass reactor, having a capacity of 1 liter and fitted with an agitation system turning at 250 revolutions per minute, there is introduced under nitrogen 500 ml of a suspension in n-hexane of the support prepared as described above, this suspension containing 0.2 gramme-atoms of magnesium. After decantation, the supernatant hydrocarbon phase is withdrawn. The reactor is then heated to 50° C. and there are introduced 2 ml of ethyl benzoate (14 millimoles). The suspension is maintained under agitation for 2 hours, then there are introduced 2 moles of pure titanium tetrachloride (220 ml). The temperature is raised to 80° C., and this temperature is maintained for 2 hours. The solid obtained is then washed with n-hexane at 50° C. to give the catalyst ready for use, in the form of a suspension in n-hexane.

The analysis of the catalyst shows that it contains, per gramme atom of magnesium: 2.05 gramme atoms of chlorine, 0.014 gramme-atoms of titanium, 0.016 mole of ethyl benzoate and that it contains no trace of di-isoamyl ether.

The catalyst thus defined is a yellow-greyish coloured powder, consisting of particles of spheroidal shape, having a particle size distribution such that Dm/Dn equals 1.2 with Dm=60 microns; it is found moreover that more than 90% by weight of the particles have a mean diameter comprised between Dm±10%; these particles have a surface as smooth as that of the initial support.

Prepolymerisation in Suspension

Into a stainless steel reactor, having a capacity of 5 liters and fitted with an agitation system turning at 750 revolutions per minute, there are introduced under cover of nitrogen 25 millimoles of tri-isobutyl aluminium (TiBA), 9.25 millimoles of methyl paratoluate and a quantity of the catalyst prepared as in Example 7 corresponding to 2.5 gramme-milliatoms of titanium. The suspension is made up to 2 liters with n-hexane. There is introduced into the reactor at ambient temperature (20° C.) a volume of 30 ml of hydrogen measured under normal conditions, then propylene at a rate of 200 g/hour for 2¼ hours. At the end of this time, the suspension of prepolymer is maintained under agitation for a further half hour. The reactor is de-gassed and, always under cover of nitrogen, the prepolymer powder is washed three times with n-hexane. The suspension of prepolymer in n-hexane is then decanted into a rotary evaporator under vacuum. There are obtained 510 g of a dry prepolymer powder, consisting of spheroidal particles, of a particle size distribution such that the ratio Dm/Dn is equal to 1.4, of a mean diameter by mass equal to 175 microns, having a smooth surface and containing, per gramme of prepolymer, $5 \times 10^{-3}$ gramme-milliatoms of titanium. This powder is preserved under nitrogen.

Polymerisation of Propylene

Into a fluidised bed reactor, of a diameter of 46 cm, operating with a rising gas propelled at a speed of 45 cm/sec and under partial pressures of 0.1 MPa of hydrogen and 1.5 MPa of propylene, there are introduced in a sequential manner 0.8 kg/hour of the dry prepolymer powder prepared as in Example 7. There is introduced continuously a solution in n-hexane of a mixture of TnOA and of methyl paratoluate in a molar ratio 1/0.25, at a rate corresponding to 450 millimoles of TnOA per hour. The temperature of the fluidised bed is maintained at 60° C. during the whole polymerisation. On intermittent sequential withdrawal, there are obtained about 25 kg/hour of a dry polypropylene powder directly useable which contains, per gramme, $1.6 \times 10^{-4}$ gramme-milliatoms of titanium, for a residence time of 6 hours in the reactor. This polypropylene powder has a mean diameter by mass equal to 400 microns, a bulk density of 0.45 g/cm³, a residue insoluble in boiling n-heptane of 90% by weight and a melt index under 5 kg at 190° C. of 2 g/10 minutes.

EXAMPLE 8

Copolymerisation of Propylene and Ethylene

One operates exactly as in Example 7, and in particular with the same prepolymer, except that the fluidised bed reactor operates under partial pressures of 1.4 MPa of propylene and 0.1 MPa of ethylene instead of 1.5 MPa of propylene alone, and that there are introduced into the fluidised bed reactor 0.6 kg/hour of prepolymer instead of 0.8 kg/hour.

On intermittent withdrawal, there are obtained about 20 kg/hour of a dry powder of a copolymer of propylene and ethylene directly useable which contains, per gramme, $1.5 \times 10^{-4}$ gramme-milliatoms of titanium. This copolymer powder has a mean diameter by mass of 410 microns, a bulk density of 0.44 g/cm³, a content of units derived from ethylene of 5% by weight, a residue of copolymer in soluble in boiling n-heptane of 85% by weight and a melt index under 5 kg at 190° C. of 3 g/10 minutes.

We claim:

1. Polyolefin prepolymer powder comprising a Ziegler-Natta catalyst in an active form for use in a (co-)polymerisation of olefins in a gas fluidised bed process, the said prepolymer containing per gram 0.002 to 0.1 milligram-atoms of a transition metal belonging to Groups IV, V or VI of the Periodic Table of Elements and consisting of particles having a mean diameter by mass Dm comprised between 80 and 300 microns and a particle size distribution such that the ratio Dm/Dn between the mean diameter by mass Dm and the mean diameter by number Dn is less than or equal to 3.

2. Polyolefin prepolymer powder according to claim 1, wherein the said prepolymer contains atoms of magnesium.

3. Polyolefin prepolymer powder according to claim 1, wherein the transition metal is titanium.

4. Polyolefin prepolymer powder according to claim 3, wherein said prepolymer contains magnesium chloride.

5. Polyolefin prepolymer powder according to claim 1, wherein the said prepolymer contains an organometallic compound of a metal of Groups I to III of the Periodic Table of Elements.

6. Polyolefin prepolymer powder according to claim 5, wherein the organometallic compound is an organoaluminum compound.

7. Polyolefin prepolymer powder according to claim 6, wherein the organo-aluminum compound is of the formula $$Al(R_{14})_3$$

in which $R_{14}$ is an alkyl radical having 2 to 12 carbon atoms.

8. Polyolefin prepolymer powder according to claim 6, wherein the atomic ratio of Al to transition metal is between 0.5 and 200.

9. Polyolefin prepolymer powder according to claim 1, wherein the said prepolymer contains per gram $4 \times 10^{-3}$ to $3 \times 10^{-2}$ milliatoms of the transition metal.

10. Polyolefin prepolymer powder according to claim 1, wherein said prepolymer consists of particles having a Dm comprised between 100 and 300 microns.

11. Polyolefin prepolymer powder according to claim 1, wherein said prepolymer consists of particles having a Dm comprised between 100 and 240 microns.

12. Polyolefin prepolymer powder according to claim 1, wherein said prepolymer consists of particles having a particle size distribution such that the ratio Dm/Dn is comprised between 1.1 and 2.5.

13. Polyolefin prepolymer powder according to claim 1, wherein the said prepolymer contains an electron donor compound.

14. Polyolefin prepolymer powder according to claim 1, wherein the said preplymer is a polyethylene.

15. Polyolefin prepolymer powder according to claim 1, wherein the said prepolymer is a polypropylene.

16. Polyolefin prepolymer powder according to claim 15, wherein the said prepolymer contains an organoaluminum compound complexed by an electron donor compound.

17. Polyolefin prepolymer powder according to claim 14, wherein said prepolymer contains atoms of magnesium and titanium, and an organo-aluminum compound of the formula:

$$Al(R_{14})_3$$

in which $R_{14}$ is an alkyl radical having 2 to 12 carbon atoms, in amounts such that it contains per gram $4 \times 10^{-3}$ to $3 \times 10^{-2}$ milligram atoms of titanium, and in that it consists of particles having a Dm comprised between 100 and 300 microns and a particle size distribution such that the ratio Dm/Dn is comprised between 1.1 and 2.5.

18. Polyolefins prepolymer powder according to claim 17, wherein said prepolymer contains magnesium chloride.

19. Polyolefins prepolymer powder according to claim 15, wherein said prepolymer contains atoms of magnesium and titanium, and an organo-aluminum compound of the formula:

$$Al(R_{14})_3$$

in which $R_{14}$ is an alkyl radical having 2 to 12 carbon atoms, in amounts such that it contains per gram $4 \times 10^{-3}$ to $3 \times 10^{-2}$ milligram atoms of titanium, and in that it consists of particles having a Dm comprised between 100 and 300 microns and a particle size distribution such that the ratio Dm/Dn is comprised between 1.1 and 2.5.

20. Polyolefin prepolymer powder according to claim 17, wherein said prepolymer contains the organo-aluminum compound complexed by an electron donor compound.

21. Polyolefin prepolymer powder according to claim 17, wherein said prepolymer contains magnesium chloride and an electron donor compound.

* * * * *

UNITED STATES PATENT AND TRADEMARK OFFICE
CERTIFICATE OF CORRECTION

PATENT NO. : 5,087,522
DATED : February 11, 1992
INVENTOR(S) : Jean C. Bailly et al It is certified that error appears in the above-identified patent and that said Letters Patent is hereby corrected as shown below:

Col. 2, l. 50, should read "contacting of one or more"

Col. 4, l. 44, after "which" and before "is" insert $--R_7--$

Col. 8, l. 45, correct the spelling of the word "mix"

Signed and Sealed this

Twenty-ninth Day of June, 1993

Attest:

MICHAEL K. KIRK

*Attesting Officer*     Acting Commissioner of Patents and Trademarks